(12) United States Patent
Lee

(10) Patent No.: US 8,568,659 B2
(45) Date of Patent: Oct. 29, 2013

(54) FIBER OPTIC DEVICE

(75) Inventor: Dennis Lee, Houston, TX (US)

(73) Assignee: Mabgen, LLC, Houston, TX (US)

( * ) Notice: Subject to any disclaimer, the term of this patent is extended or adjusted under 35 U.S.C. 154(b) by 917 days.

(21) Appl. No.: 12/208,669

(22) Filed: Sep. 11, 2008

(65) Prior Publication Data

US 2010/0062949 A1    Mar. 11, 2010

(51) Int. Cl.
*C12Q 1/68*      (2006.01)
(52) U.S. Cl.
USPC ........................................................... 422/50
(58) Field of Classification Search
USPC ........... 422/50; 506/33; 428/403; 435/6, 164; 356/318, 477
See application file for complete search history.

(56) References Cited

U.S. PATENT DOCUMENTS

| | | | | |
|---|---|---|---|---|
| 5,274,417 | A * | 12/1993 | Yamaguchi | 355/30 |
| 6,221,566 | B1 * | 4/2001 | Kohnke et al. | 430/321 |
| 6,396,995 | B1 * | 5/2002 | Stuelpnagel et al. | 385/136 |
| 7,468,375 | B2 * | 12/2008 | Dress et al. | 514/300 |
| 2003/0148332 | A1 * | 8/2003 | Taylor et al. | 435/6 |
| 2003/0170914 | A1 * | 9/2003 | Guire et al. | 436/518 |
| 2004/0132112 | A1 * | 7/2004 | Angelides | 435/7.2 |
| 2007/0027441 | A1 * | 2/2007 | Almeida | 606/9 |
| 2010/0261288 | A1 * | 10/2010 | Recknor et al. | 436/164 |

OTHER PUBLICATIONS

Ribeiro, AJ et al (1999) International Journal of Pharmaceutics 187: 115-123.*
Ribeiro Int. J. Pharmaceutics (1999) 187:115-123.*

* cited by examiner

*Primary Examiner* — N. C. Yang
*Assistant Examiner* — Richard Moerschell
(74) *Attorney, Agent, or Firm* — Conley Rose, P.C.

(57) ABSTRACT

The present invention is directed to a fiber optic device consisting of a fiber bundle having multiple legs of silica fibers, using a plurality of microspheres construct to attach target cells, for the assay of cytotoxic compounds. Each leg of silica fibers consists of twenty-five or more silica fibers treated with biotin and streptavidin treated microspheres which chemically bind the microspheres to the silica fibers. Further, the present invention is directed to the unique microspheres. The microspheres have a core, preferably alginate, with an outer surface of chitosan.

The present invention is further directed to the use of the described fiber optic device to isolate, research and develop biological medicaments and diagnostic cytotoxic compounds. The fiber optic device utilizes thousands of fibers and the unique microspheres to provide a high-throughput screening device.

17 Claims, 13 Drawing Sheets

FIBER OPTIC DEVICE

FIELD OF THE INVENTION

The present invention is directed to a fiber optic device for aiding in isolating, researching and developing biological medicaments and diagnostic compounds. More specifically, the present invention is directed to a fiber optic device and its subparts developed to allow hitherto unavailable high-throughput screening and isolation of therapeutic human monoclonal antibodies useful in passive immunity treatments. Further the present invention is directed to a method for isolating human hybridomas and/or monoclonal antibodies for certain human cancers. Finally, the device can be adapted to allow rapid testing of known cytotoxic agents against an individual's distinct cancer, and to identify diagnostic modalities for such cancers.

BACKGROUND OF THE INVENTION

An immune system defends against invasion by microorganisms or infiltration by cancer cells by producing antibodies, proteins which can complex with the invading microorganisms or cancer cells and target them for destruction or removal. Any foreign molecule or modified native molecule of sufficient size can act as a stimulus for antibody production. B lymphocytes, the cells that actually produce antibodies, recognize and respond to an antigen by reproducing (cloning) themselves and then producing antibodies specific to that foreign invader (refined antibodies). In viral infections and certain cancers, because the invaders are adept at mutation, there is a competition between the immune response and the virus or cancer cells, with each adapting to mutations made by the other in an effort to achieve victory. A successful outcome for the host requires that the virus or cancer can no longer evade the host defense. This may require a series of antibodies produced by the B cell such that each move and countermove ends in an immunological checkmate, where the "matured" antibody produced is sufficiently refined to ward off all (or most) subsequent attacks from the same or similar invaders. Once the foreign invader is destroyed, the production of the refined antibodies by B cell lymphocytes subsides and the B cell returns to a resting state, although it retains a genetic memory of the foreign invader and can respond effectively on a subsequent attack.

Recent technological advances have made it possible to isolate and cultivate a single clone of lymphocytes to obtain a virtually unlimited supply of antibodies specific to particular disease targets. These antibodies, known as "monoclonal antibodies" because they arise from a single clone of lymphocytes, are produced by hybridoma technology. Conventional and well-established hybridomas technology takes advantage of the fusion (hybridization) of an immortal cell (often a myeloma cell) with the isolated antibody producing cell to produce a hybrid cell known as a hybridomas. For example, in one of the earliest demonstrations of the concept, spleen cells from a mouse presented with an antigen were fused with myeloma cells to create hybridomas. The hybridomas can be isolated by transferring them to a growth fluid that kills off the unfused cancer cells, while the unfused spleen cells die off by themselves.

Hybridomas produce antibodies to the antigen initially injected into the mouse. The single hybridoma or hybridomas secreting antibody into the medium are then screened and those with the desired characteristics are selected. Each hybridoma reproduces itself and these identical self-cloned hybridomas each produce identical monoclonal antibodies having the same antigen affinity (binding strength) and specificity. In this way, a virtually unlimited supply of identical antibodies is created, directed to a highly specific antigen.

The Isolation of B Lymphocytes from Human Blood and the Subsequent Generation of Human Hybridoma Cell Lines have also been Well-Established To generate immortal cells expressing antibodies useful in therapy of a particular disease, one well-established method is to transform human peripheral blood lymphocytes from a patient with the disease of interest with Epstein Barr virus (EBV) as described for example in Gorny, M. K. et al., Proc. Nat'l. Acad. Sci. USA 86:1624-1628 (1989). Generation of human antibodies from primed donors has also been performed by stimulation with CD40, resulting in expansion of human B cells, Banchreau et al., F. Science (1991), 251:70, Zhang et al., J., Immunol. (1990), 144, 2955-2960, Tohma et al., J. Immunol. (1991), 146:2544-2552, or by an extra in vitro booster step prior to immortalization. Chaudhuri et al., Cancer Supplement (1994), 73, 1098-1104. The B cells resulting from either method are then fused with a myeloma cell, forming immortal monoclonal antibody-producing hybridomas. See, e.g., U.S. Pat. No. 4,897,466 incorporated by reference.

SUMMARY OF THE INVENTION

The present invention is directed to a fiber optic device consisting of a fiber bundle having multiple legs of silica fibers, using a plurality of microspheres construct to attach target cells, for the assay of cytotoxic compounds. Each leg of silica fibers consists of twenty-five or more silica fibers treated with biotin and streptavidin treated microspheres which chemically bind the microspheres to the silica fibers. Further, the present invention is directed to the unique microspheres. The microspheres have a core, preferably alginate, with an outer surface of chitosan.

The present invention is further directed to the use of the described fiber optic device to isolate, research and develop biological medicaments and diagnostic compounds. The fiber optic device utilizes thousands of fibers and the unique microspheres to provide a high-throughput screening device.

BRIEF DESCRIPTION OF THE PREFERRED EMBODIMENTS OF THE INVENTION

Figure 1:
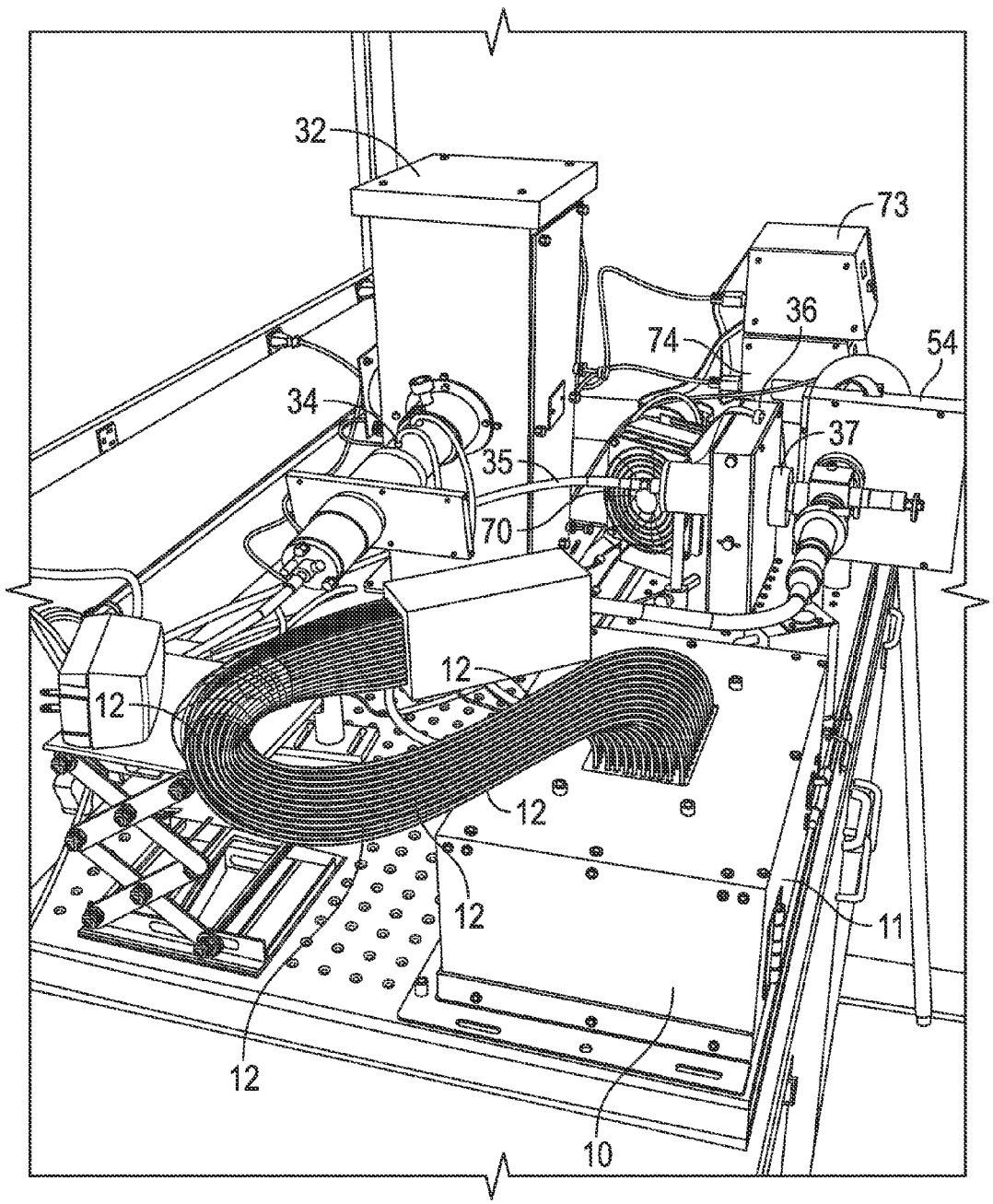
FIG. 1 is a photo of the fiber optic device of the present invention on the lab bench.

It is currently difficult to isolate specific human antibodies with therapeutically useful properties from diseased individuals because the desired antibodies are interspersed with less functional antibodies (indeed even "background" antibodies) and moreover are often present in a low titer. The desired antibodies are like the proverbial needle in the haystack. To find such therapeutically useful human antibodies blood containing protective antibody candidates from a large patient population, creating a large pool of antibodies to screen, is necessary. That is, one is more likely to find antibodies which have improved cell killing ability, increased affinity, increased specificity (they do not target or kill any other cells) and other desirable properties if one screens large numbers of antibody candidates from large numbers of patients.

The High-Throughput Fiber Optic Device Described in this Application Allows Much More Rapid Identification of Such Candidates.

A further problem relating to isolation of therapeutic antibodies utilizing current techniques is that such antibodies may only protect the patient it was isolated from (patient-specific), or, in the alternative, may protect other patients and not the patient it was isolated from (patient-insensitive). This can be true even where the disease cells from different individuals appear to be identical or nearly identical. Therefore, another advantage of high-throughput screening for antibodies from a large number of patients is that one is more likely to isolate cross-protective antibodies useful in a larger numbers of patients having a particular disease or condition.

Moreover, in certain disease states, therapeutic passive immunization may actually require multiple antibodies, all acting in combination or synergistically. It has been difficult previously to screen for multiple antibodies which in combination have such a therapeutic effect, especially where a pool of antibody expressing cells are taken from many patients and there are a large number of combinations of antibodies possible.

Again, the High-Throughput Fiber Optic Device Described in this Application Allows a Method of Screening for Therapeutic Antibodies that are Effective or More Effective in Combination.

The present invention is directed to a fiber optic device having a screening platform consisting of a large fiber bundle having multiple legs that consist of multiple silica fibers, each array made for a well (specifically each well in a 96 well microtiter plate) to screen for therapeutic antibodies and a titer plate (specifically a 96 well microtiter plate) platform that contains the cytotoxic compounds to be screened.

The fiber optic device is shown in the drawings that are photos of the various individual elements or pieces of equipment that illustrate the device of the present invention.

Figure 2:
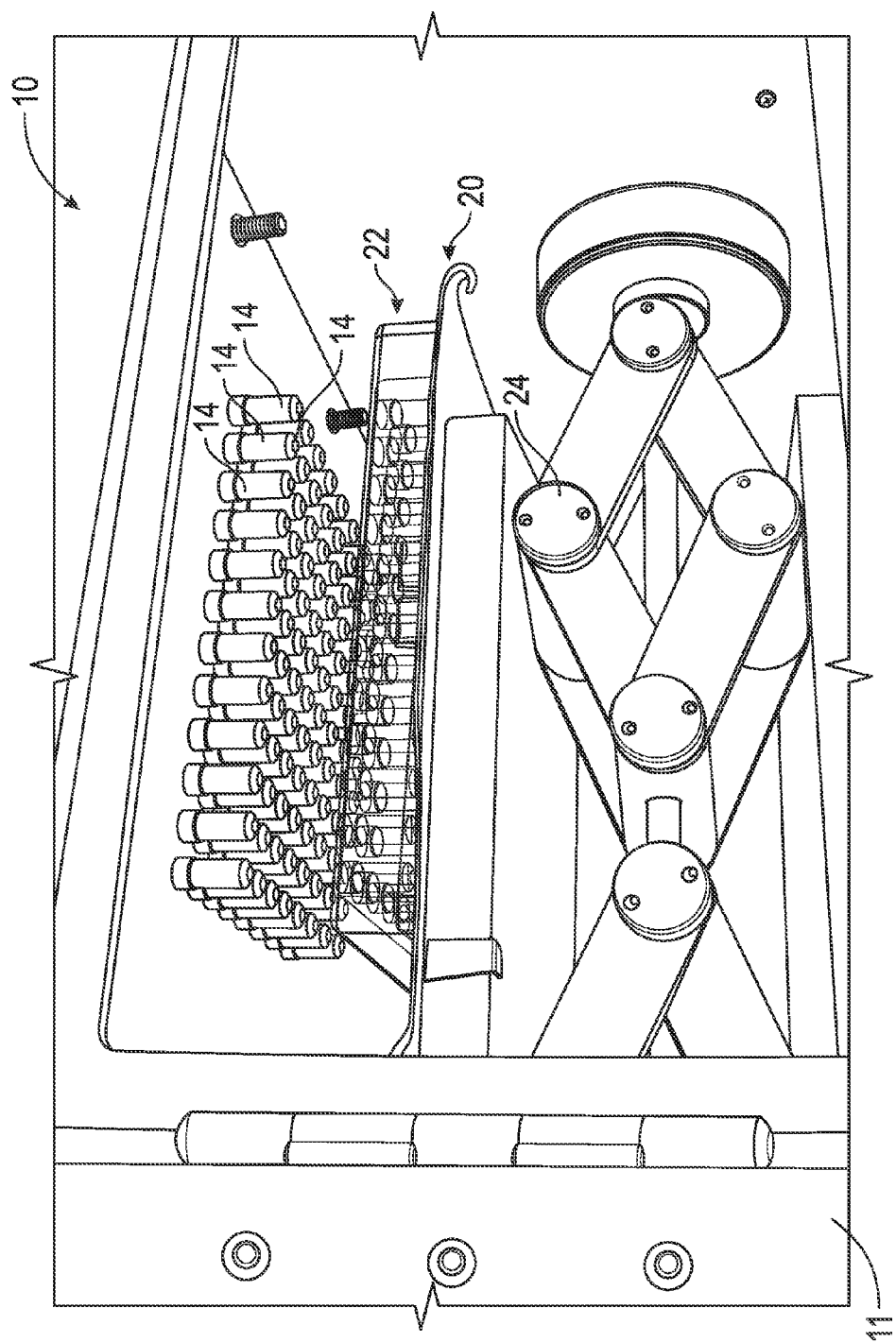
FIG. 2 is a photo of the device of the present invention with emphasis on the titer plate platform that is used to attach the microspheres to the silica fibers and to hold the samples of cytotoxic compounds.

Referring now to FIG. 1, the fiber optic device of the present invention comprises a screening platform and a titer plate platform. The screening platform includes a dark box 10 and the fiber optic elements outside box 10, i.e. the elements seen in FIG. 1 on the lab bench, all of which will be described hereinafter. Dark box 10 has a door 11 for access to the titer box platform 20 that is inside dark box 10. Titer plate platform 20 includes a titer plate 22 on a lab jack 24, see FIG. 2. Looking in open door 11 of dark box 10, a bundle of fibers having multiple legs 12 of silica fibers that are embedded with epoxy in cylindrical ferrules 14 (96 total in a 12×8 rectangle) extend into the dark box 10. Each leg 12 has twenty-five or more silica fibers. The distal end of each silica fiber is exposed in dark box 10.

Figure 3:
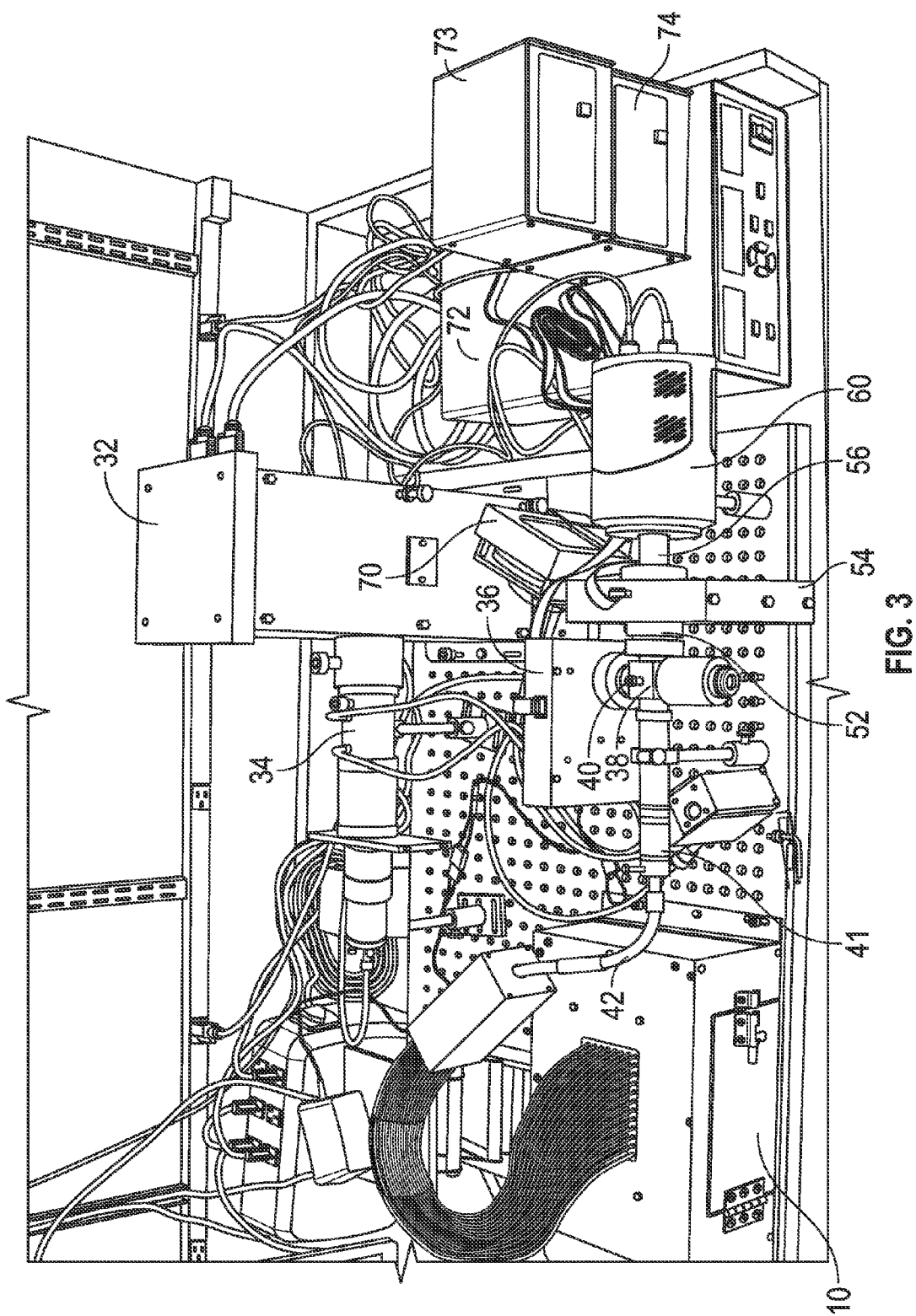
FIG. 3 is a photo of the device of the present invention taken at essentially 900 to the photo of FIG. 1.

Referring to FIG. 1 and FIG. 3, each are photos of the fiber optic device of the present invention but 90° in perspective of each other. Both are necessary to illustrate the basic flow of the excitation light to the distal end of the fibers, and the attached microspheres, and the emitted light returning from the microspheres to the camera. The light in the screening platform of the fiber optic device of the present invention is as follows: a light originates at a source, specifically an arc lamp 32, and passes into an infrared filter 34, cooled by water to protect the downstream parts, then passes through liquid light guide 35 and an excitation filter 36 (selecting an appropriate excitation wavelength), then into a filter holder 38 that holds a dichroic filter 40. Dichroic (showing dichroism), means the property of a substance of having one color when it reflects light and another when it transmits light. One dichroic filter reflects blue light and transmits green light. The source light enters filter holder 38 through adapter 37 for connecting the filter wheel 36 to the dichroic filter holder where dichroic filter 40 is positioned at 450 to the inlet adapter 37. The dichroic filter 40 reflects the light 900 through optic adapter 41 that passes the excitation light into each fiber of fiber bundle 42 and thus, each leg 12. Attached to the end of each leg 12 are a plurality of microspheres 50 (which are described in detail hereinafter). This combination of elements is what is meant as using a fiber optic device with a microsphere(s) construct.

The excitation light passes through each leg 12 (a total of 9600 fibers, each fiber in fiber bundle 42) and the emitted light from the microspheres 50 travels back up the fibers as part of the fiber optic fiber bundle 42, through optic adapter 41 to the dichroic filter 40. At this point, the emitted light passes through dichroic filter 40 and into a optic connector 52, emission filter 54 and another connector 56 holding camera 60. The image of the camera 60 is recorded on a computer and screen (not shown) and stored.

Figure 4:
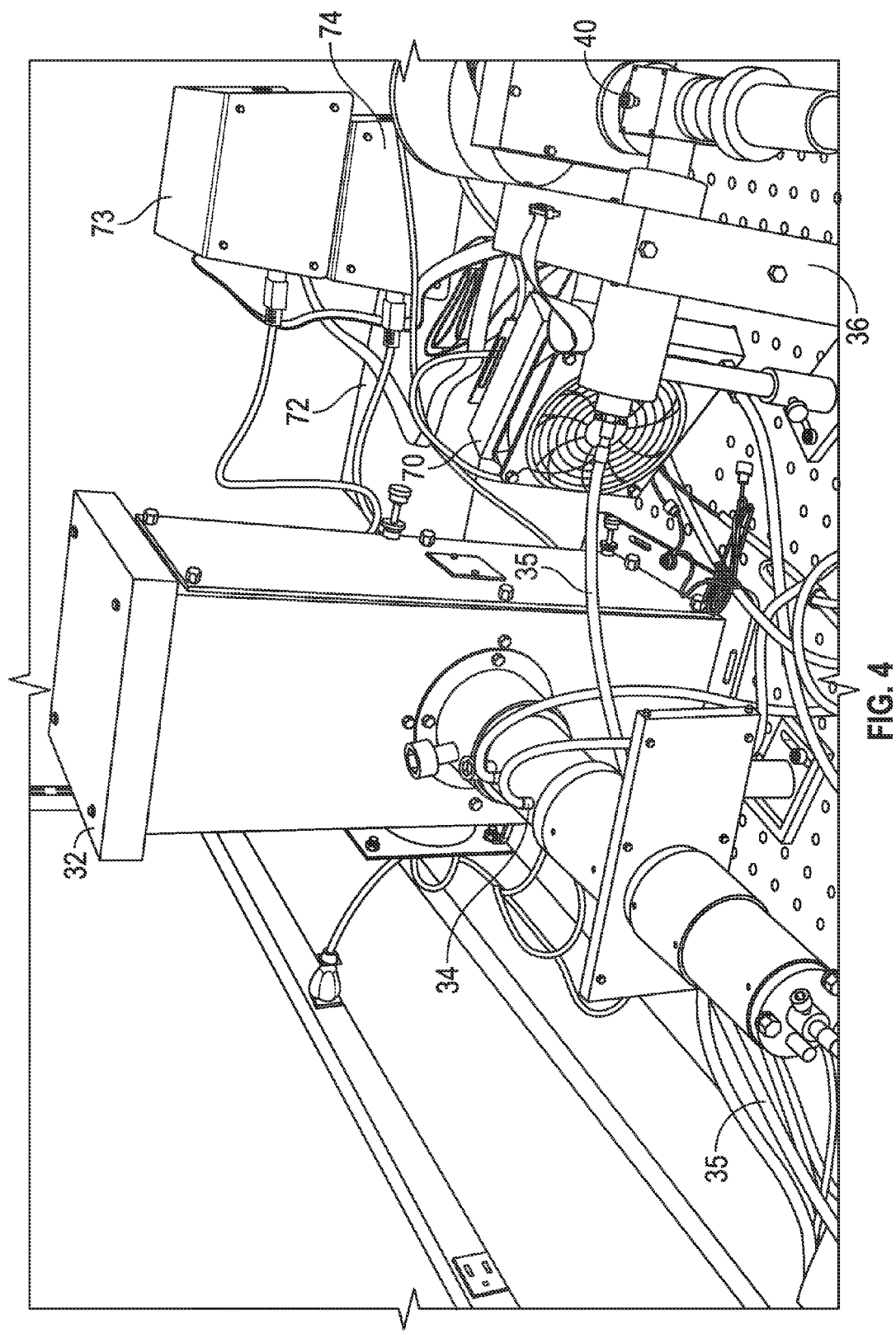
FIG. 4 is a photo of the device of the present invention with details of the light or excitation source, an arc lamp, that passes excitation light to the microspheres through the silica fibers of the fiber optic device of the present invention.

Referring to FIG. 4, a different perspective of the camera taking the photo of the device of the present invention is used to show details of the source of the excitation light. Arc lamp 32 originates the excitation light that passes directly through an infrared filter 34 that is cooled by water. The light then passes through liquid light guide 35 to the excitation filter 36, which is a filter wheel that adjusts the wavelength to the desired wavelength. The filtered light then passes through the filter 36 into the dichroic filter holder 38 that holds dichroic filter 40.

Figure 5:
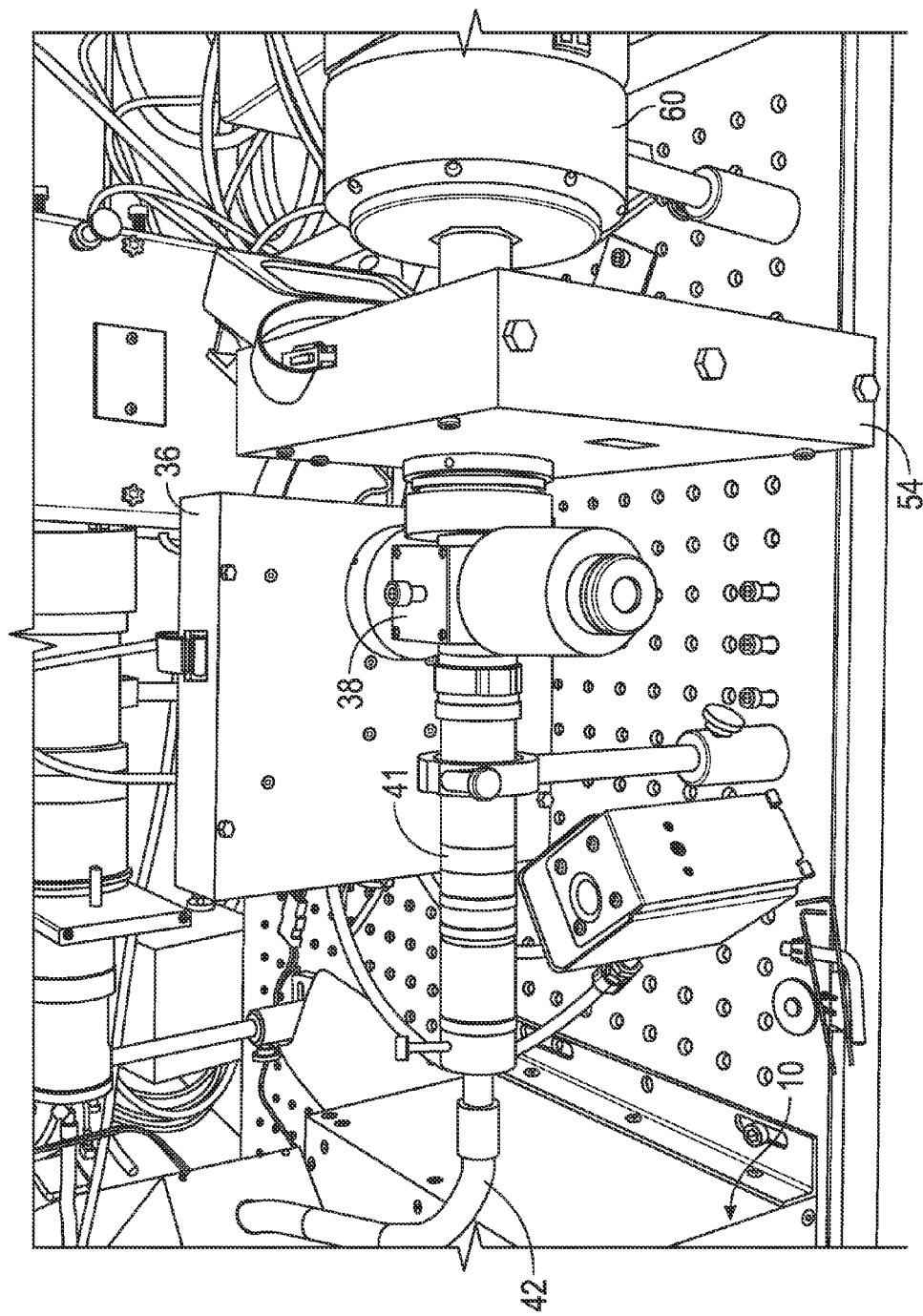
FIG. 5 is a photo of the device of the present invention with details of the emission light and the recording device, a camera, which records the results.

Referring to FIG. 5, a different perspective of the camera taking the photo of the device of the present invention is used to show details of the emitted light from microspheres 50, as the emitted light passes up each leg 12 of the silica fibers to the fiber optic bundle 42, through optic adapter 41 to and through the dichroic filter 40. The emitted light then passes into adapter 52 and emission filter 54, which is a filter wheel. At the back of emission filter 54 is a connector 56 that holds a CCD camera 60.

Referring again to FIGS. 1, 3 and 4, auxiliary equipment is shown, namely, a small fan 70 that removes heat from the equipment due to the high heat energy from the infrared light filter 34 and arc lamp 32; a power source 72 for arc lamp 32; a filter wheel control 73 and 74 for the excitation filter 36 and the emission filter 54; and a computer (not shown).

Figure 6:
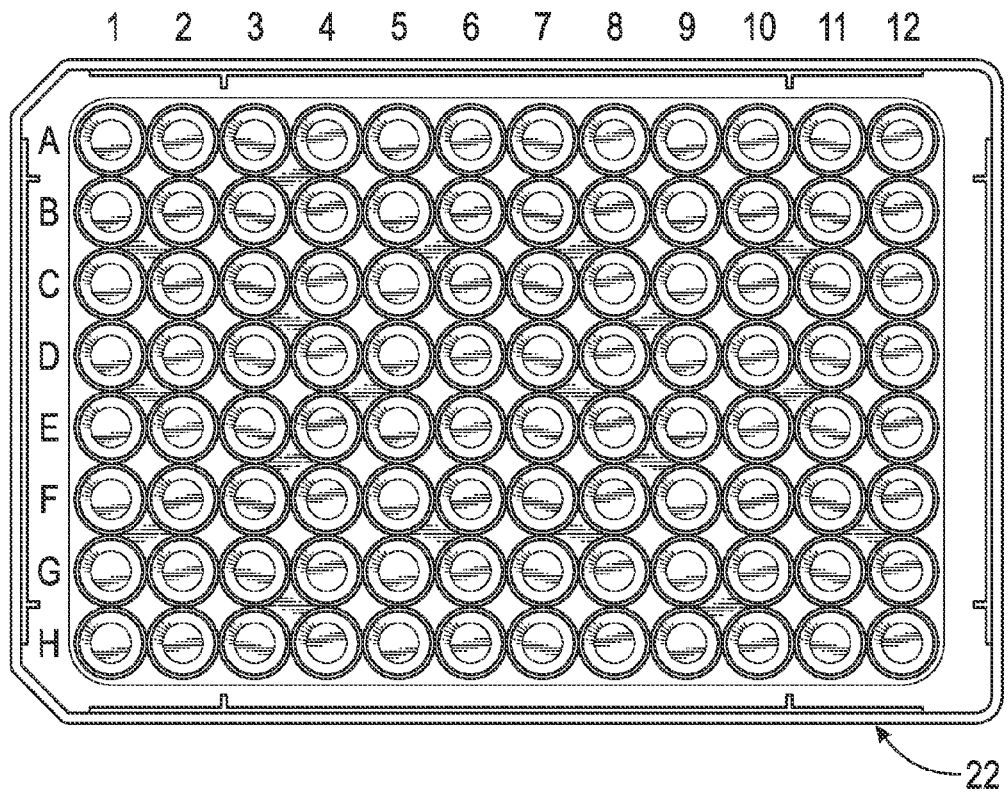
FIG. 6 is a photo of a 96 well microtiter plate.
Figure 7:
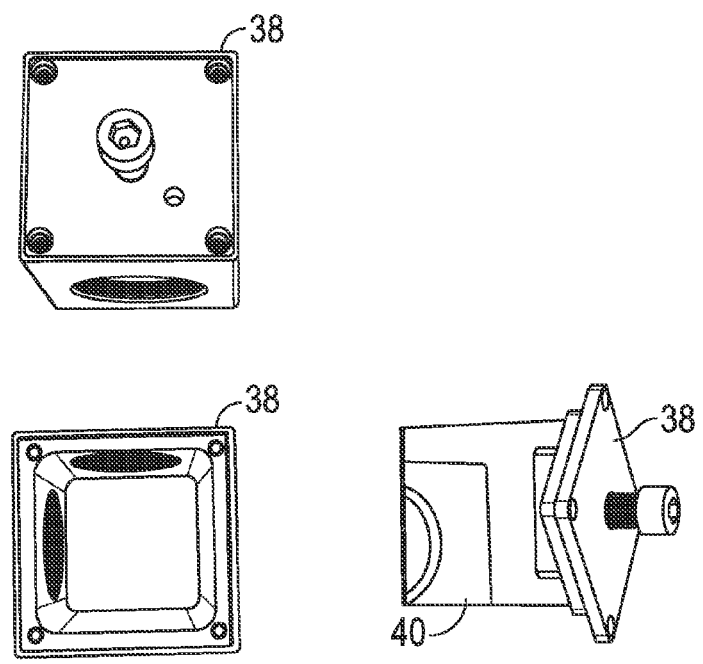
FIG. 7 is a photo of several dichroic filters and their filter holders.
Figure 8:
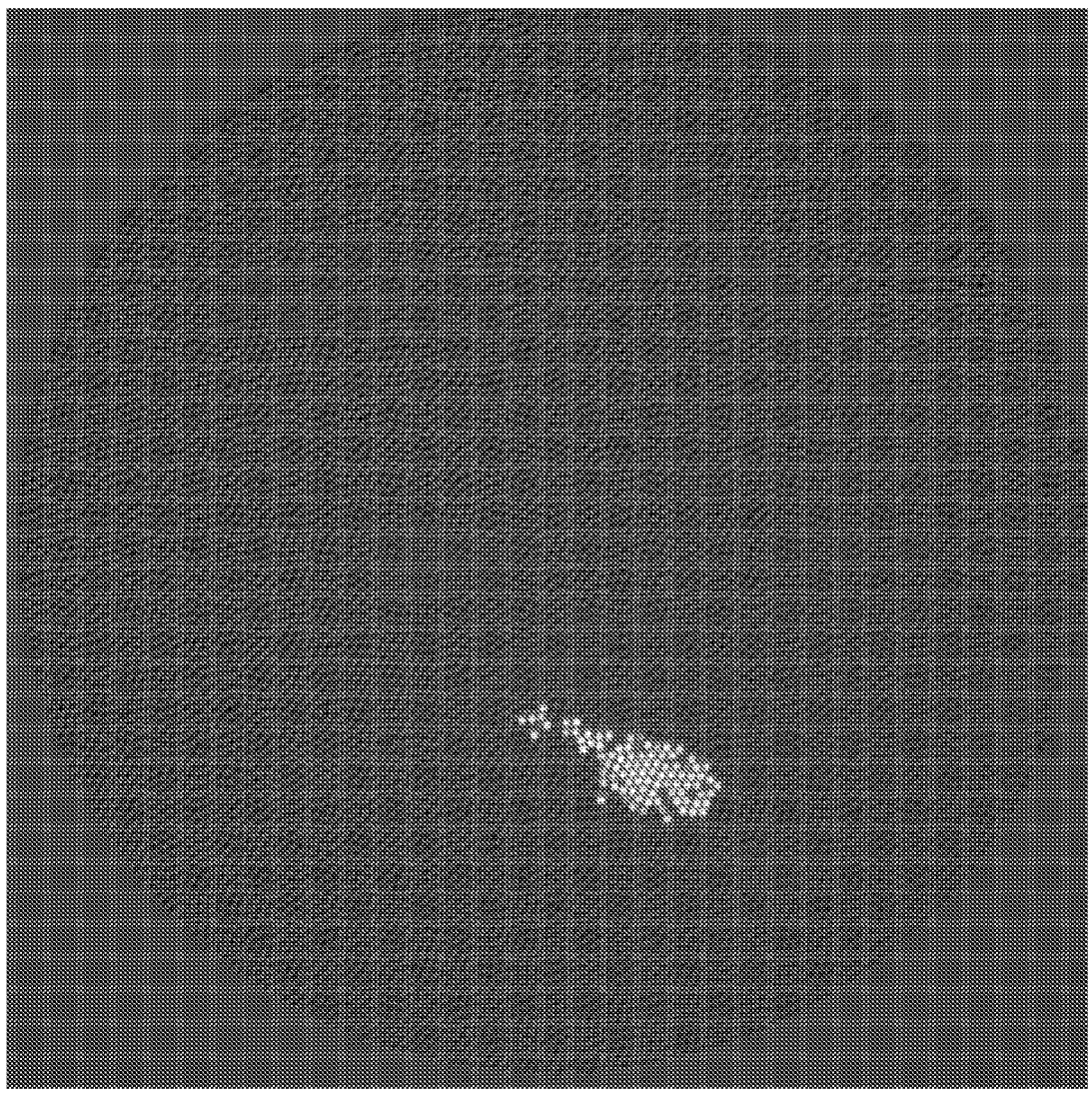
FIG. 8 is a photo of a sample image from the camera.

FIGS. 6, 7 and 8 illustrate specific elements; namely,

FIG. 6 is a photo of a 96 well microtiter plate, with each well identified such as A1, D4;

FIG. 7 is a photo of a dichroic filter 40 and three dichroic filter holders 38; and FIG. 8 is a photo of an image from the camera 60.

The present invention is further described in the following examples that are exemplary of the preparation of the fibers, microspheres/microbeads, incorporation of ligands and dyes, and the use thereof in the optic device described above.

This procedure is to prepare the silica fibers for attachment of the microspheres or microbeads, these terms being used interchangeably.

Example 1

Silica Fiber Ends with Chemically Attached Biotin

1. The fiber face is cleaned with isopropyl alcohol,
2. allowed to dry,
3. and then rinsed with pure water and allowed to dry.
4. A solution of (3-mercaptopropyl)trimethoxysilane (MPS) is prepared −5% (v/v) in methanol.
5. The fibers are dipped into the MPS solution and allowed to incubate for up to 4 hours at room temperature.
6. The fibers are then allowed to air dry 2 hours,
7. Then rinsed repeatedly with pure water and allowed to dry. The fibers have now been functionalized with a thiol group.
8. The fibers are then dipped into a solution of biotin maleimide (Na(3-maleimidylpropionyl)biocytin) prepared in dimethyl sulfoxide (DMSO) and allowed to react for 2-4 hours.
9. The fibers are then rinsed in a series of washes, beginning with methanol and finishing with pure water.
10. The fibers are then allowed to air dry.

Following the above procedure the silica fibers are biotin functionalized.

Note that other bonding agents could be used to create a bonding "pair" with a complementary substance placed on the microsphere. The example of the complementary streptavidin protein-ligand complementary-prepared microsphere preparation is described below in example 4. But any substance that binds with the silica ends and which has a bonding complement that can be incorporated into the microsphere is an alternative for biotin in example 1.

The Following Procedures are to Prepare the Microspheres or Microbeads

Example 2

Alginate Core/Chitosan Shell Microspheres

Please refer to the flow chart that follows Example 4 for a visual representation of the multi-step process used to create the microspheres Reagents:
  4% solution of sodium alginate in water (w/v)
  5% solution of hydroxypropyl methylcellulose (HPMC) in water (w/v)
  Nanopowder iron (can be precipitated from solution of iron sulfate)
  Petroleum ether
  Mineral oil
  Tween-80
  20% solution of calcium chloride in water (w/v)
  Chitosan
  Acetic acid Equipment Needed:
  Variable-speed overhead stirrer
  Wide-mouth round bottom flask Procedure:
  Creation of Alginate Core Particles
  1. Add 2 mL of HPMC solution to 8 mL of sodium alginate solution. Mix well in a conical flask.
  2. Add 20 mg of iron oxide powder to 9 mL dH20 and mix. Add 1.0 mL of the HPMC-alginate solution to the iron oxide flask and mix. Allow the majority of the iron oxide to settle. This creates 10 mL of aqueous phase HPMC-alginate and iron oxide. The use of iron oxide is optional, but assists in the magnetic wash separation procedure. Alternatively, one could omit the iron oxide preparation and simply dilute 1 mL of HPMC-alginate with 9 mL of dH20.
  3. In a separate round bottom flask, add a 20:10:1 mixture of petroleum ether, mineral oil, and Tween-80. Use enough to submerge the impeller head of the overhead stirrer. This volume will vary depending on the size of the flask.
  4. Mix at high speed (example: 9000 RPM).*

* Note that the ultimate size of the microspheres depends on the size of the alginate core and can be varied by changing the mixing speed at this step, i.e., increasing mixing speed decreases alginate core and thus microsphere size, while decreasing mixing speed increases alginate core and thus microsphere size. Microspheres may be generated in a range of 5-500 microns or greater in diameter. Preferably, microspheres with diameters of 30-75 microns are generated.

5. While mixing, using a small bore nozzle (syringe needle or glass nozzle), add the 10 mL of HPMC-alginate mixture dropwise to the organic phase created in step 3. Allow the mixture to emulsify under powered mixing for 15 minutes.
  6. Add 10 mL of calcium chloride solution dropwise to mixture. Allow to mix for 1 hour.
  7. Stop mixing and allow the mixture to settle into separate organic and aqueous phases. Decant most of the organic phase as waste.
  8. Wash remaining mixture (aqueous phase, residual organic phase, and alginate particles) repeatedly in a separatory funnel. Washes can consist of 1% calcium chloride solution, acetone, distilled water or other solvents. The alginate particles can be collected by filtration or magnetic separation and remain in suspension.

Figure 9:
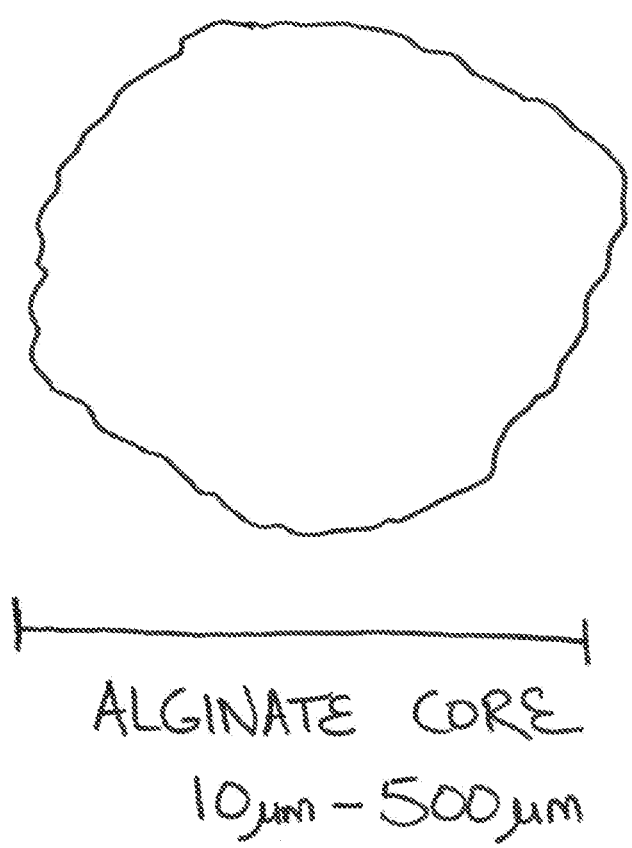
FIG. 9 is a hand-drawn illustration of the alginate core of a microsphere or microbead, both terms to be used interchangeably.

Please refer to FIG. 9

This figure illustrates the alginate core of the microsphere or microbead having an irregular surface and dimensions that may vary from 10 microns to 500 microns.

Creation of Chitosan Shell
  1. Prepare a 0.2% solution of chitosan in 5% acetic acid.
  2. Add chitosan solution dropwise to the alginate particle suspension created above while vortexing on medium speed for at least 15 minutes. The volume of chitosan solution should equal the volume of the alginate core suspension.

3. Wash particles repeatedly with water or a final buffer of choice. The alginate core-chitosan shell microspheres can be collected by filtration or magnetic separation.

Figure 10:
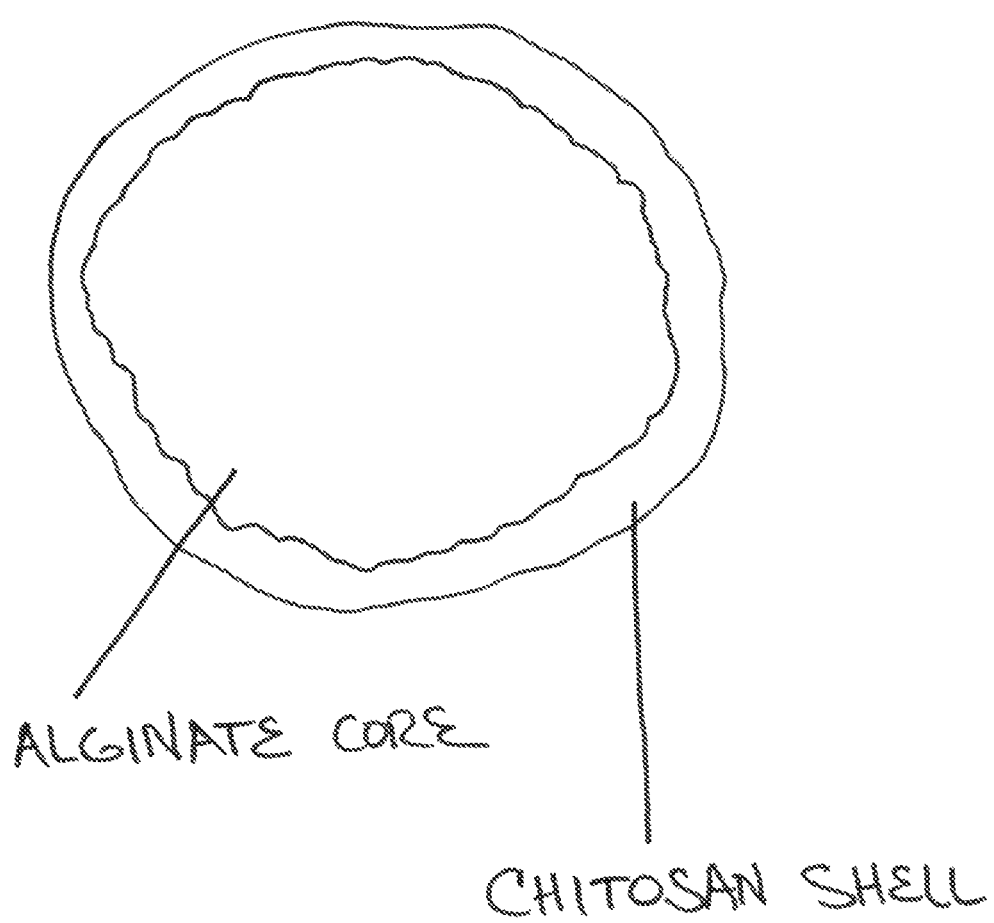
FIG. 10 is a hand-drawn illustration of a microsphere or microbead containing the alginate core and the outer chitosan shell. This is an illustration of a completed microsphere or microbead product.

Please refer to FIG. 10

This figure illustrates a microsphere or microbead with an alginate core, as described above, and an outer chitosan shell.

Example 3

Fluorophore-Labeled Alginate Core/Chitosan Shell Microspheres

Please refer to the flow chart that follows Example 4 for a visual representation of the multi-step process used to create the microspheres In order to track microspheres bearing different target cells lines, for multiplexed functional assays of the same potentially cytotoxic products (including antibodies or small compounds), it is advantageous to color-encode the microspheres. The result is that each microsphere "color" corresponds to one target cell line and thus different target cell lines may be placed in the same assay well, allowing simplified identification of which cell lines have reacted (died) to the candidate cytotoxic product.

One color-encoding method is with fluorescent labels, carried out as follows.
1. Prepare the alginate core for the microspheres as in Example 2.
2. Add commercially available fluorophore solution (e.g. fluorescent hydrazides) drop-wise to the alginate cores while vortexing on medium speed.
3. Create the chitosan shell as per Example 2.
4. Wash several times in final buffer of choice.

Alternate color substances could also be used. The intensity of the microsphere's fluorescence will depend on the quantity of the fluorophore used. Moreover, it is also possible to increase the binding of fluorescent hydrazides, and thus the microsphere's fluorescence, using a preliminary treatment of the alginate cores with sodium m-periodate to increase the number of reactive sites in the alginate matrix.

The chitosan microspheres can then be coated with target cells as described in Example 5 below.

Example 4

Streptavidin Alginate Core/Chitosan Shell Microspheres

Please refer to the flow chart that follows Example 4 for a visual representation of the multi-step process used to create the microspheres Streptavidin, the protein-ligand compliment to biotin, is incorporated into the microsphere as follows.
1. Prepare the alginate core for the microspheres as in Example 2.
2. Add fluorophore to alginate cores, if desired, as in Example 3.
3. Add commercially available streptavidin solution drop-wise while vortexing on medium speed.
4. Create the chitosan shell as per Example 2.
5. Wash several times in final buffer of choice.

Following the above procedure the alginate cores (and thus the alginate-chitosan microsphere end products) are streptavidin functionalized.

Note that other bonding agents could be used to create a bonding "pair" with a complementary substance placed on the microsphere. The example of the complementary biotin protein-ligand complementary-prepared silica fiber preparation is described above in example 1. But any substance that can be incorporated into the microsphere and thereafter binds with the prepared complimentary silica fiber ends is an alternative for streptavidin in example 4.

Figure 11:
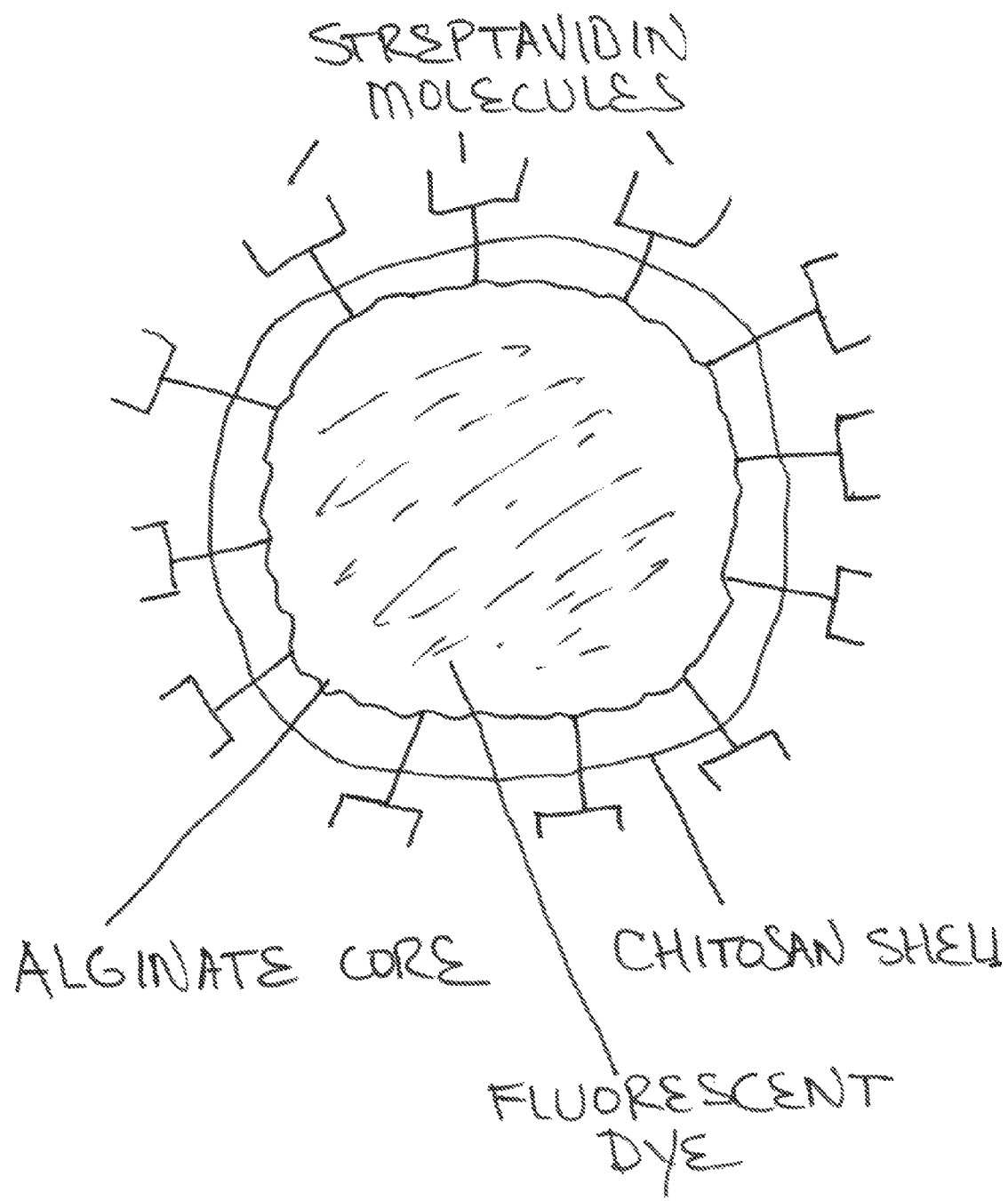
FIG. 11 is a hand-drawn illustration of a microsphere or microbead. In this illustration, fluorescent dye and streptavidin ligand or molecule have both been incorporated into the microsphere.

Please refer to FIG. 11

This figure illustrates a microsphere or microbead with an alginate core and an outer chitosan shell, as described above, and incorporated fluorescent dye and streptavidin.

The following procedure is used to prepare and load the target cells onto the microspheres

Example 5

Target Cell Loaded Alginate Core/Chitosan Shell Microspheres

1. Commercially-available cancer target cell lines (e.g. lymphoma CD20) are loaded with fluorescent dye (e.g. Live/Dead dye kit) that allows one to differentiate a live cell from a dead cell. Note that there are alternative types of such labeling available. The fluorescent colors used to color-encode the microspheres (described in Example 3) are chosen so as not to conflict with those used to prime the cells to reveal "live vs. dead." The target cells are washed in a buffer solution and resuspended at the desired concentration.
2. The target cells from step 1 are placed in solution with the fluorescently labeled, streptavidin-functionalized alginate-chitosan microspheres created in Examples 2, 3, and 4 and allowed to interact for approximately 30 minutes. Electrostatic forces (chitosan positive, cell surface negative) allow the cells to coalesce onto the chitosan surface of the microspheres.

Note that different cell lines may all be labeled with the same "live/dead" cell markers (e.g. green is alive, red is dead). In fact, alternative "live/dead" differentiating reagents are available and may be used. It is the incubation of these primed cell lines with different color-coded microspheres that provides a readily identifiable color-label for each cell type. Each different color of the color-encoded microbeads created in Example 3 provides a unique label for each cell line. Thus, if live/dead (green/red) primed cell line A is incubated with yellow-fluorescing microspheres, they can be differentiated from live/dead (green/red) primed cell line B, incubated separately with blue-fluorescing microspheres, despite both cell lines being ultimately assayed in one microtiter well (see Example 6 and 7 below).

Note also that one is not limited to using cancer cell lines. Any cell line may be used.

The following procedure is used to load the target cells-microsphere construct onto the silica optical

Example 6

Target Cell Loaded Alginate Core/Chitosan Shell Microspheres Attachment and Confirmatory Binding to Biotin-Treated Silica Fiber 1. The target cell loaded microspheres created in Example 5 are placed in a buffer solution within a microtiter well.
2. Equal amounts of the different target cell types, via equal amounts of cell-coated fluorescent beads, are mixed together in this same well.
3. This process is repeated for all 96-wells of the microtiter plate.

4. The microtiter plate is raised on the device platform so as to interact with the biotin-functionalized silica fiber ends. The streptavidin incorporated within the microspheres in Example 4 binds with the biotin-functionalized ends of the silica fibers, created in Example 1.
5. The microtiter plate is lowered.
6. The silica fiber ends are gently washed and replaced into a buffer solution.
7. A series of images is taken through the opposite end of the fiber optic device to determine which color-encoded microsphere type (and therefore which cell line) is bound to each fiber end, and also to verify the live/dead status of the cells (via green/red fluorescence).

Note that the end-result is a bundle of fibers, all of which can be placed within a single microtiter well, with multiple target cells attached via protein-ligand bonds. Fluorescent coding allows one to confirm that multiple target cell types are bound to the fibers via the microsphere. Fluorescent (here green/red) labeling also allows one to confirm that the target cells are still alive and ready for a functional assay of potential cytotoxic compounds.

Critical in this Example is the fact that the microspheres created in Examples 2, 3 and 4 float in the buffer solution. This allows efficient surface interaction and protein-ligand (biotin-streptavidin) binding of the microspheres to the silica fibers.

Chitosan has been previously described as a cellular-adherent agent in cellular growth and assays. In such descriptions, chitosan has been used to anchor cells to assay wells. This is because chitosan alone has a higher density than the many growth or assay solutions and thus sinks and adheres to the bottom surface of microtiter wells or other assay structures. Described for the first time is a method to create a chitosan-coated alginate microsphere developed specifically for the optical fiber-microsphere-tumor cell construct described above.

This microsphere is unique in that, unlike chitosan sheets or pure chitosan beads, the chitosan-coated alginate microsphere has a lower density than assay solutions and thus does not sink in the assay solution. Floating chitosan microspheres allow for close physical interaction between the microspheres and the fiber. This in turn allows a reversible binding between the functionalized silica fiber with biotin and the microspheres with streptavidin, such binding temporarily immobilizing the microspheres to the fiber ends. This physical arrangement, i.e. a roughly spherical microsphere attached to the flat end of a silica fiber in solution, allows for better solution flow around the microsphere and relatively simple non-destructive removal of the microsphere when the assay is complete.

Figure 12:
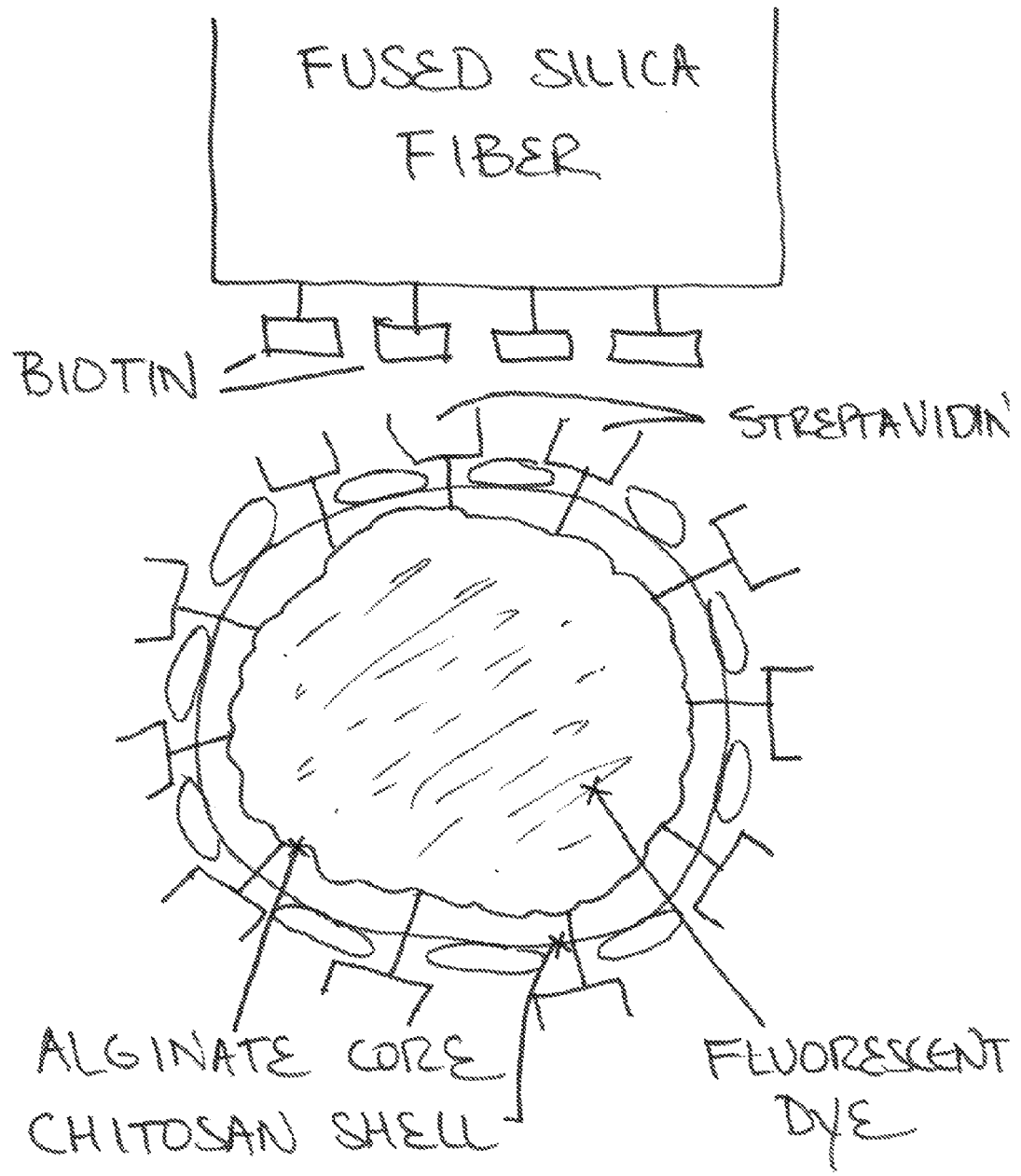
FIG. 12 is a hand-drawn illustration of a microsphere or microbead with incorporated streptavidin that binds with the biotin-functionalized ends of the silica fibers.
Figure 13:
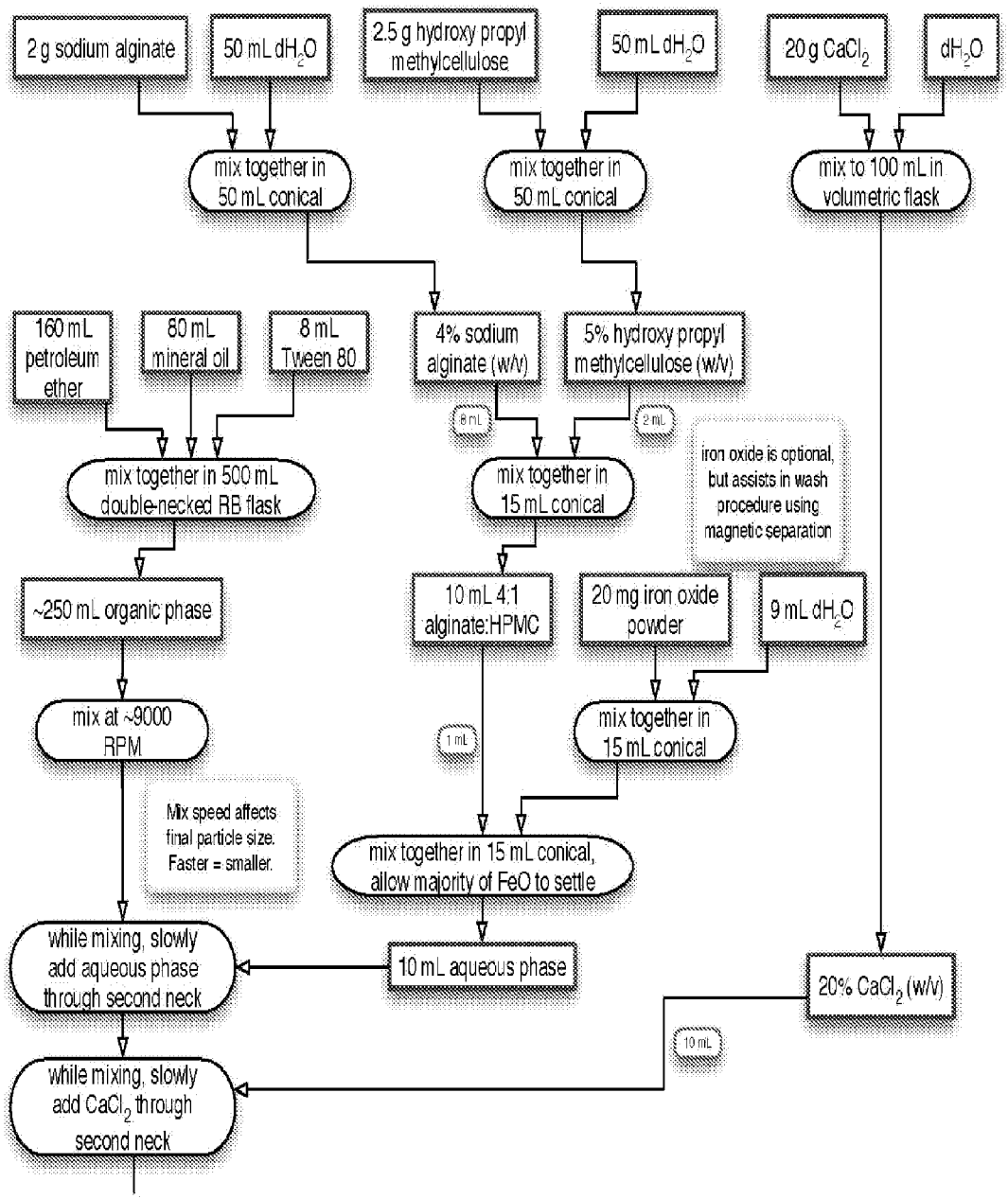
FIG. 13 is a flowchart describing the initial steps in making the bead.
Figure 14:
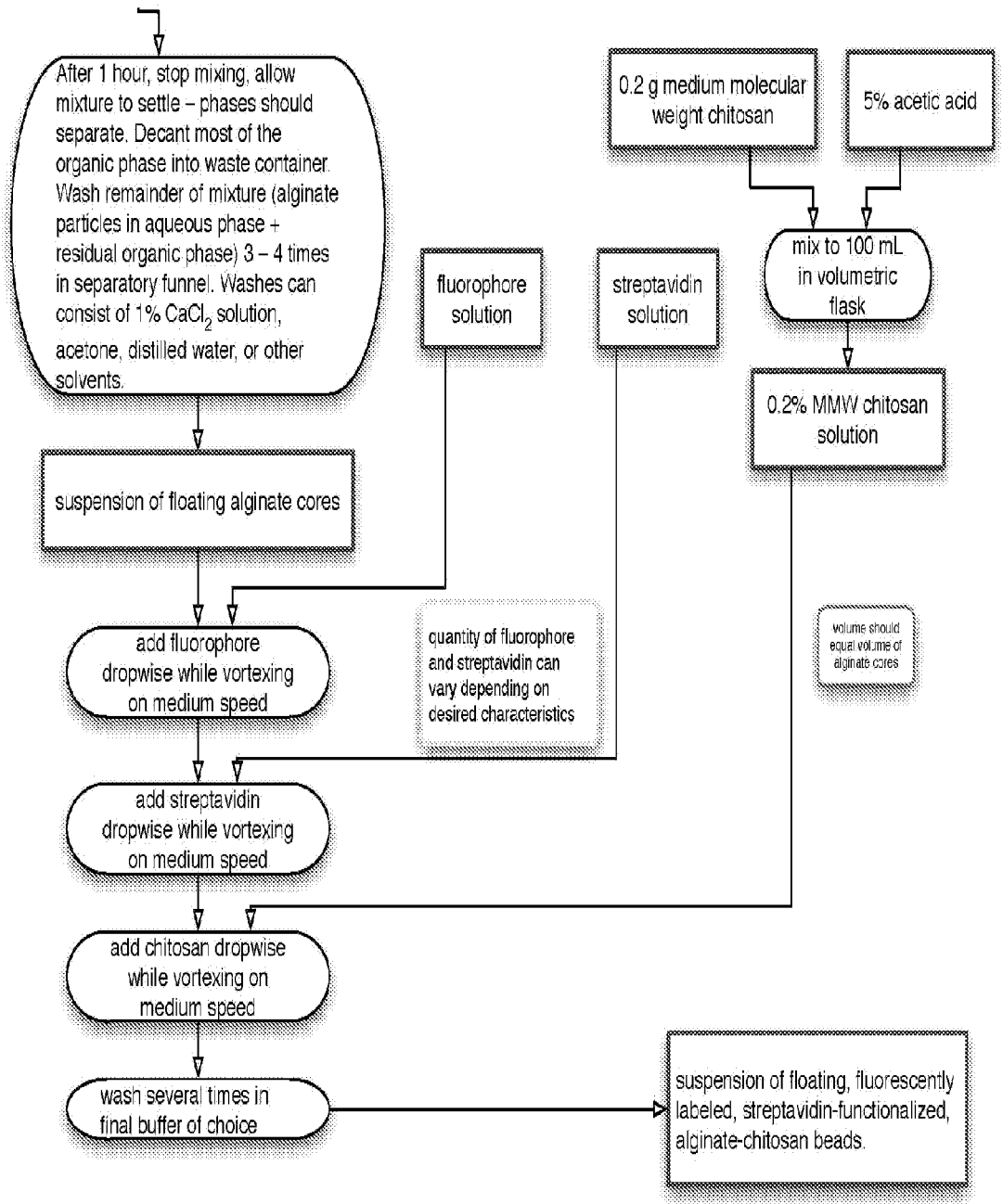
FIG. 14 is a flowchart describing the final steps in making the bead.

Please refer to FIG. 12

This figure illustrates a microsphere or microbead with an alginate core, an outer chitosan shell, incorporated fluorescent dye and streptavidin, as described above, binding via protein-ligand bonds, with the biotin-functionalized silica fibers. Note the target cells adherent to the chitosan shell.

The following procedures are used to perform a functional assay using the target cells-microsphere-silica fiber construct

Example 7

Functional Assay of Lymphoma CD20 Target Cells with Rituximab

1. Beta-cell Non-Hodgkin lymphoma lines expressing the CD20 Antigen are used as primed target cells when preparing the target-cell loaded microspheres described in Example 5.
2. Confirmatory binding of live CD20 cell-bearing fluorescent microspheres is undertaken as described in Example 6.
3. Rituximab (sold under the trade names Rituxan and MabThera), a chimeric monoclonal antibody against the protein CD20, is placed in solution in new microtiter wells. Complement cofactor may or may not be used to speed up the cytotoxic reaction.
4. The Rituximab filled wells are raised to the ends of the silica fibers.
5. After an appropriate incubation period, a series of images is taken to verify the live/dead status of the target cells (e.g. with their previously loaded fluorescent compounds described in Example 5).

Note that the CD20 cancer cell line and Rituximab were chosen as a proof of concept for the device. Rituximab is an antibody known to kill CD20 bearing cells in vitro.

Example 8

Functional Assays of Target Cells Using Alginate-Chitosan Microspheres

1. The target cell-microsphere loaded silica fibers created in Example 6 are transferred into a new 96 microtiter well test plate, where each well contains in solution a single compound or combination of compounds to be tested against the target cells. (E.g. such compounds can be monoclonal antibodies created from antibody-producing hybridomas or B-cells, small molecules, or any other compound to be tested for activity).
2. After an appropriate incubation period with the any necessary cofactors, a series of images is taken to verify the live/dead status of the target cells (e.g. with their previously loaded fluorescent compounds described in Example 5).
3. Potential candidates for cell killing activity are identified using image analysis software.

Note that this is the end-example method for the device described. Utilizing the previous examples, multiple cell lines can be color-differentiated even though they all reside on the same bundle of fibers that are placed in a single microtiter well. Unknown compounds are placed in the solution bathing the known cell types. Thus, 96 different unknown compounds, or combinations of compounds, can be tested against multiple target cell lines. Thus, the device allows a fast-throughput for determining which of the known cell targets is killed by the unknown compound in solution.

If the compounds tested were antibodies produced from hybridomas or B-cells, the parent hybridomas/cells that create the cytotoxic antibodies can be selected, grown and the antibodies isolated for further testing as therapeutic agents. Such selection, growth and antibody isolation is well-described.

If the antibodies or compounds are ones isolated from a patient with a specific cancer using well-known techniques, a library of such compounds could be quickly constructed, whether by creating a hybridoma library (if the compound was an antibody to the cancer) or a delineated list of the cytotoxic small molecules created in such patients. Thus, a "backward-constructed library" of cancer killing compounds could be constructed using the device to initially screen for compounds.

Note that alternatively, known target cell lines could be placed on the microspheres, after having been primed with a dye or dyes that change when a non-cytotoxic binding antibody or substance attaches to the target cell. This would allow identification of potentially diagnostic antibodies or other substance.

Example 9

Functional Assays of Patient-Specific Target Cells Using Alginate-Chitosan Micro Spheres 1. Rather than multiple cell lines, the target cells are malignant cells harvested from a specific cancer patient and grown in culture using standard techniques.
2. These cells are primed with fluorescent dyes and loaded onto fluorescent beads as described in Example 5.
3. The target cell-microsphere loaded silica fibers are created as described in Example 6 and are then transferred into a new 96 microtiter well test plate, where each well contains in solution a single compound or combination of compounds to be tested against the patient-specific target cells. (E.g. such compounds can be monoclonal antibodies created from antibody-producing hybridomas or B-cells, small molecules, or any other compound to be tested for activity).
4. After an appropriate incubation period with the any necessary cofactors, a series of images is taken to verify the live/dead status of the target cells (e.g. with their previously loaded fluorescent compounds described in Example 5).
5. Potential candidates for patient-specific cell killing activity are identified using image analysis software.

Note that alternatively, known compounds in current use as chemotherapeutic agents could be used in a rapid assay to determine which agents are most active in vitro against a specific patient's cancer. Alternatively, the compounds in solution could unknown isolates from the bloodstream of the very same patient or even pool of patients with the same type of cancer.

The following procedures are used to describe potential uses of the functional assay using the target cells-microsphere-silica fiber construct

Example 10

Redundant/Confirmatory Functional Assays of Target Cells Using Alginate-Chitosan Microspheres 1. The functional assay is performed utilizing the method described in Example 8. However, rather than different candidate cytotoxic compounds being placed in each of the 96 wells, the same "likely candidate" cytotoxic compound is placed in all 96 wells.
2. The assay is performed as described in Example 8.

Note that this use describes a multiply-redundant means of confirming that the cytotoxicity of a compound against a cell line or lines is indeed physiological and not due to laboratory error. In short, thousands of cells of each line are tested in redundancy rather than the cells that reside on a single bundle of silica fibers, allowing confirmation of actual cytotoxicity.

Example 11

Control Functional Assays of Target Cells Using Alginate-Chitosan Microspheres

1. The functional assay is performed utilizing the method described in Example 8. However, rather than different candidate cytotoxic compounds being placed in each of the 96 wells, a non-cytotoxic "control" compound is placed in some of the wells.
2. The assay is performed as described in Example 8.

Note that this use describes a means of confirming that the cytotoxicity of a compound against a cell line or lines is indeed physiological and not due to laboratory error. In short, cells of each line are tested in a control, non-cytotoxic solution as addition to wells containing potential or actual cytotoxic solutions, allowing confirmation of actual cytotoxicity.

Example 12

Concentration-Variable Functional Assays of Target Cells Using Alginate-Chitosan Microspheres 1. The functional assay is performed utilizing the method described in Example 8. However, rather than different candidate cytotoxic compounds being placed in each of the 96 wells, different concentrations of the compounds can be placed in the wells.
2. The assay is performed as described in Example 8.

Note that this use describes a means of confirming the cytotoxicity of a compound against a cell line or lines at a defined concentration of compound in solution. With the rapid throughput of the device, and 96 wells available, multiple assays of different compounds of different concentration against different cell lines could be performed rapidly in a single microtiter plate.

Example 13

Dual Functional Assays of Target and Normal Human Cells Using Alginate-Chitosan Microspheres 1. The functional assay is performed utilizing the methods described in Example 8, 9, 10, 11, or 12.
2. Live "normal" human cells have been previously grown in the wells of the microtiter plate using standard cell culture techniques.
3. The candidate cytotoxic compound, standard chemotherapeutic agent, dilution, or control solution is added to the wells.
4. The assay is performed as described in Example 8.
5. The "normal" human cells are examined using standard microscopic techniques and confirmatory culture to evaluate for cell death.

Note that this use describes a means of confirming the cytotoxicity of a compound against a cell line or lines while simultaneously evaluating the cytotoxicity of that compound against normal human cells. With the rapid throughput of the device, and 96 wells available, multiple assays allow the rapid comparison of abnormal cell killing: normal cell killing ratios. In short, the substance can be evaluated simultaneously as to killing target cancer cells and discovering the LD50 of that same substance.

The foregoing examples are illustrative only and variations and modifications thereof are well within the skill of the art.

What is claimed is:

1. A fiber optic device to assay libraries of cytotoxic compounds comprising:
    an optical screening platform consisting of a fiber bundle having multiple legs of twenty-five or more silica fibers arranged to be inserted into wells of a titer plate, wherein each of the fibers is coated in biotin at the end that is inserted into the wells of the titer plate;
    a plurality of floating microspheres chemically attached to each leg of fibers, wherein each of the microspheres consist of an alginate core and a chitosan shell having a streptavidin coating and are carrying target cells; and a means for recording changes to said target cells on said microspheres at the distal end of said fibers when said target cells are contacted with cytotoxic compounds.

2. A device according to claim 1 wherein each leg contains 100 fibers.

3. A device according to claim 1 wherein there are 96 wells in said titer plate.

4. A device according to claim 1 wherein said cytotoxic compounds are antibodies.

5. A device according to claim 1 wherein said target cells are cancer cells.

6. A device according to claim 1 wherein said floating microspheres range from 30 to 75 microns.

7. A device according to claim 1 wherein said microspheres include a fluorescent dye.

8. A device according to claim 7 wherein said fluorescent dye comprises a fluorophore-labelled alginate core.

9. A device according to claim 5, wherein said cancer cells are cells of different cancers.

10. A device according to claim 9, wherein said cancer cells are cancer cells of different cell lines.

11. A device according to claim 7, wherein said microspheres are marked with different colors.

12. A method to assay cytotoxic compounds comprising:

attaching target cells to the surface of floating microspheres, wherein the microspheres comprise a fluorophore labeled, alginate core and a streptavidin coated, chitosan shell;

attaching the microspheres to the distal end of optical fibers, wherein the distal end of the optical fibers are coated in biotin;

forming a bundle of the optical fibers;

filling a titer plate having a plurality of wells with a solution of products of cytotoxic compounds, wherein each well comprises a different cytotoxic compound;

introducing the microspheres to the wells, such that each microsphere is contacted with at least cytotoxic compound under reaction conditions; and activating a light source such that the light is transmitted to the microspheres to determine the target cells that react with said cytotoxic compounds;

wherein transmitting the light comprises filtering the light source output to form a first monochroic light;

providing the light to the optical fibers;

receiving light from the optical fibers, filtering the received light to form a second monochroic light; and recording the received light in an optical processing system;

wherein said target cells are treated to indicate a reaction.

13. The method of claim 12 wherein said target cells are treated to include a fluorescent marker to indicate a reaction.

14. The method of claim 12 wherein said cytotoxic compounds are at least one chosen from the group consisting of monoclonal antibodies, multiple antibodies, antibody-producing cells, and hybridomas.

15. The method of claim 12 wherein attaching target cells to the surface of microspheres comprises attaching cancer cells to microspheres, and wherein the microspheres are encoded dependent on the cancer cells attached thereto.

16. The method according to claim 15 wherein the cancer cells are a diagnosed cancer isolated from a cancer patient.

17. A fiber optic device to assay libraries of cytotoxic compounds comprising:

an optical screening platform comprising:

a light source;

a light filter;

a water-cooled light guide;

a di-chroic light filter; and an adapter configured to direct light from the di-chroic light filter;

a plurality of fiber bundles coupled to and extending from the adapter of the optical screening platform into wells of a titer plate at a distal end of the fiber bundles, wherein the distal end of the fiber bundles are coated in biotin and the fiber bundles having multiple legs of twenty-five or more silica fibers, and wherein the fiber bundles are in light communication with the light source;

a plurality of microspheres chemically attached to each leg of fibers carrying target cells, wherein the microspheres have a fluoro-phore labeled, buoyant, alginate core and a streptavidin-coated, chitosan shell; and a camera coupled to the optical screening platform for imaging light changes at said target cells on said microspheres at the distal end of said fibers when said target cells are contacted with cytotoxic compounds.

* * * * *